US007882652B2

(12) United States Patent
Elliott et al.

(10) Patent No.: US 7,882,652 B2
(45) Date of Patent: Feb. 8, 2011

(54) TRADESHOW DISPLAY WITH ANGULARLY ADJUSTABLE POST

(75) Inventors: John T. Elliott, Eagan, MN (US); Mark A. Fritsche, Eagan, MN (US)

(73) Assignee: Skyline Displays, Inc., Eagan, MN (US)

( * ) Notice: Subject to any disclaimer, the term of this patent is extended or adjusted under 35 U.S.C. 154(b) by 320 days.

(21) Appl. No.: 12/205,342

(22) Filed: Sep. 5, 2008

(65) Prior Publication Data

US 2010/0058634 A1 Mar. 11, 2010

(51) Int. Cl.

| | |
|---|---|
| ***G09F 17/00*** | (2006.01) |
| ***G09F 15/00*** | (2006.01) |
| ***G09F 15/02*** | (2006.01) |
| ***G09F 11/18*** | (2006.01) |
| ***A47G 23/02*** | (2006.01) |
| ***F16M 11/00*** | (2006.01) |
| ***A47B 91/00*** | (2006.01) |

(52) U.S. Cl. ............................ 40/603; 40/610; 40/514; 40/606.12; 40/604; 248/154; 248/346.03; 248/346.3; 248/346.06; 248/125.8; 248/161; 248/125.7

(58) Field of Classification Search .................. 40/603, 40/610, 514, 606.12, 604; 248/154, 346.03, 248/346.3, 346.06, 125.8, 161, 125.7
See application file for complete search history.

(56) References Cited

U.S. PATENT DOCUMENTS

| | | | | |
|---|---|---|---|---|
| 4,700,498 | A * | 10/1987 | Perutz et al. | 40/603 |
| 7,337,567 | B2 | 3/2008 | Fritsche et al. | |
| 2009/0056184 | A1 | 3/2009 | Fritsche et al. | |

* cited by examiner

*Primary Examiner*—Lesley Morris
*Assistant Examiner*—Syed A Islam
(74) *Attorney, Agent, or Firm*—Patterson Thuente Christensen Pedersen, P.A.

(57) ABSTRACT

A banner stand including a banner presenting graphics thereon, a base and a post operably coupled to the base and extending upwardly therefrom, and a support member operably coupleable with the post to support the banner in an upright display mode and to convert the banner to a curved configuration, wherein when the banner is the upright curved display mode, the banner includes a banner axis along a length thereof, the banner axis in a first position at an angle relative to an absolute vertical, wherein the angle is greater than zero degrees. The banner stand can further include an adjuster presented with the base and configured to enable adjustment of the post, such that the banner axis is effected to a second position, wherein the angle is substantially equal to zero degrees with respect to absolute vertical.

13 Claims, 9 Drawing Sheets

TRADESHOW DISPLAY WITH ANGULARLY ADJUSTABLE POST

FIELD OF THE INVENTION

The present invention relates generally to tradeshow displays. More particularly, the embodiments of the present invention relate to tradeshow displays formed of one or more banner stands.

BACKGROUND OF THE INVENTION

Tradeshow displays are often collapsible and can be easily transported and erected. Such displays can divide spaces at tradeshows and present visual graphics for viewing by attendees. One pleasing aspect of such displays is the ability to provide some depth, such as by providing a smooth-flowing, curved display surface. One structure used at trade shows includes a network of support rods that expand into a volumetrically substantial three-dimensional structure. Such expanded structures can then be covered with sheet material capable of presenting graphics.

Other types of displays include retractable banner stands where a banner with graphics is suspended upright in a straight rectangular shape by a post or pole extending upwardly from a housing. The housing contains the retraction mechanism, retains the banner in the collapsed or retracted state, and has feet providing generally a four-point support on the floor. These banner stands are relatively inexpensive, present a small footprint when erected, are compact when collapsed, are quite light weight, are quickly expanded and erected and can have replaceable banners. To maintain the light weight the support posts are often small diameter tubular members that can flex under a bending moment. Such displays are often used in reception areas, trade shows, museums, art exhibits, academic and research society meetings, advertising displays, and other areas in which visual information is temporarily displayed. Such retractable banner stand have been enhanced by adding one or more adjacent like banner stands in series or can have lighting or other appurtenances added. Most recently, techniques have been developed to selectively provide a curvature to the banner about a vertical axis after the banner has been extended. It has recently been recognized that these enhancements, particularly the curvature and appurtenances added thereto may effect a forward loading of the banner causing a transfer the center of gravity of the banner forward causing a forward tilt to the support post and banner. Such a tilt may not be aesthetically desirable and can cause instability of the banner stand giving it a tendency to tip over.

BRIEF SUMMARY OF THE INVENTION

In an aspect, a banner stand includes a banner presenting graphics thereon, a base with floor engaging feet, a upright post operably coupled to the base and extending upwardly therefrom, and a horizontal support member operably coupleable with the post to support the banner in an upright display mode. The upright display mode convertible from a planar display mode to a display mode with a curvature about an upright axis. Whereby in the curvature mode the center of gravity of the banner stand is shifted forward causing a forward tilt to the banner. The banner stand can further include an adjuster mechanism presented with the base and configured to enable angular adjustment of the post, such that the banner axis is effected to a second position, wherein the angle is substantially vertical.

In another aspect, a method of providing a tradeshow display and instructions for selectively adjusting a vertical axis of the banner thereof includes assembling a tradeshow display including a banner presenting graphics thereon, a base and a post operably coupleable to the base to extend upwardly therefrom, a support member operably coupleable with the post to support the banner in an upright display mode, wherein when the banner is an upright display mode, the banner includes a banner axis along a length thereof, and an adjuster presented with the base to adjust the banner axis relative to the absolute vertical as well, of course, to the horizontal. The method can further include providing instructions to angularly adjust the post if the banner axis is at an angle less than 90 degrees with respect to the horizontal floor surface. The tradeshow display banner will have an upright position and may tilted forward upon addition of an appurtenance, such as lighting, or upon conversion to a curved form such as illustrated in U.S. Pat. No. 7,337,567, owned by the owner of the instant application, and incorporated herein by reference. Also incorporated by reference is pending application Ser. No. 12/042213, filed Mar. 4, 2008, claiming priority to the above U.S. Pat. No. 7,337,567 patent.

In a further aspect, a method of adjusting a vertical axis of the banner of a tradeshow display includes providing a tradeshow display including a banner presenting graphics thereon, a base and a post operably coupleable to the base to extend upwardly therefrom, a support member operably coupleable with the post to support the banner in an upright display mode, wherein when the banner is an upright display mode, the banner includes a banner axis along a length thereof, and an adjuster presented with the base to adjust the banner axis relative to the absolute vertical. The method can further include determining if the banner axis is at an angle greater than zero relative to an absolute vertical, wherein if the angle is greater than zero degrees, utilizing the adjuster to adjust the banner axis relative to the absolute vertical, such that the angle is substantially equal to zero degrees.

In yet another aspect, a tradeshow display includes one or more banner stands, each of the banner stands including a banner formed of a flexible sheet material for suspending in a substantially upright open position, the banner having graphics thereon, a housing including a core for winding the banner thereon and a retracting mechanism for unwinding and winding the banner with respect to the core, a post extending upwardly from the housing, a support member operably coupleable with the post to support the banner in an upright display mode when the banner is unwound from the housing, wherein when the banner is the upright display mode, the banner includes a banner axis along a length thereof, and a curved form selectively changeable from a first configuration into a curved configuration to selectively impart a curve to the banner when the banner is in the upright open position, wherein when the curve is imparted to the banner, the curved form causes the angle to be greater than zero degrees. The banner stands can further include a post adjuster having a first portion having a cavity therein and a slider portion including an aperture therethrough, the post being insertable into the cavity through the aperture, the aperture movable relative to the cavity to effect angular movement of the post with respect to the housing enabling adjustment of the banner axis relative to the absolute vertical and the horizontal plane of the floor.

A feature and advantage of embodiments of the invention is that the angular position of the post can be adjusted based on the curvature being provided to the banner and based on addition of other appurtenances. Enhancements to a conventional retractable banner stand may be added and the stability of the banner stand is preserved.

A feature and advantage is a banner stand that has a banner convertible from a straight planar extended upright configuration to an upright configuration curved about a vertical axis and a pole positioning feature to maintain the banner in vertical alignment in both positions.

A feature and advantage of embodiments of the invention is that the pole is pivotal within a cup portion defining a pole seating hole. The hole may be tapered and have a bottom seat sized to engage and support the end of the support pole and a top lip that constrains and defines swing limits of the pole. The pole may pivot within the bottom seat and be restrained by a top lip of the hole. Such lip can limit the pivot motion to a single pivot axis and with pivot stop points. In certain embodiments the lip defines a slot. A further movable member may be positionable with respect to the cup portion to fix the position of the pole with respect to the cup.

A feature and advantage of embodiments of the invention is a retractable banner stand with a housing, floor engaging feet connecting to the housing to provide at least three point contact with the floor, a post extendable vertically from the housing, a lower portion of the post extending from the housing and having a specific angle with respect to the horizontal floor, a banner extendable from and retractable into the housing and suspendable from the post, a mechanism for providing curvature to the banner about an upright axis of the banner whereby when the banner is provided said curvature the banner tilts forward, and a mechanism for selectively adjusting the angle of the lower portion of the post with respect to the feet engaging the horizontal floor such that the banner is tilted in rearwardly direction correcting said forward tilt. In embodiments the post is inserted into a receptacle in the housing, with the receptacle providing such selective adjustment. In other embodiments other means of providing selective adjustment of the angle of the lower portion of the post with respect to the horizontal may be provided, for example the housing with respect to the feet may be rotatable thereby moving the pole with respect to the feet and correcting the tilt of the banner.

DETAILED DESCRIPTION OF THE DRAWINGS

Figure 1B:
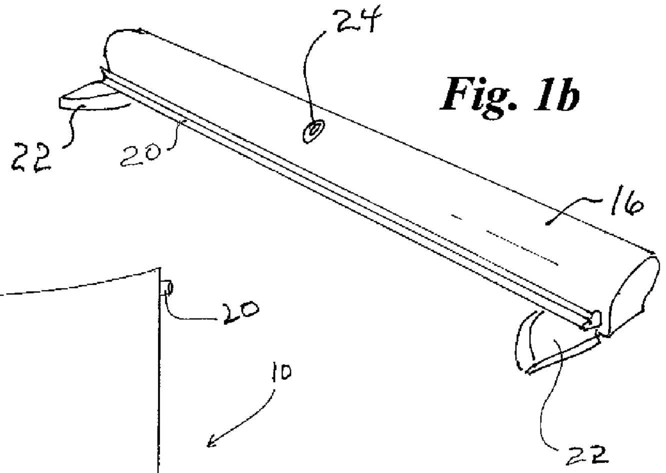
FIG. 1*b* is a front perspective view of a base of a banner stand with the banner retracted therein.

As can be seen in FIGS. 1-3*c*, a banner stand 10 of a tradeshow display according to embodiments herein generally comprises a banner 12 having graphics 14 presented therewith, a base 16, and a post 18 operably coupled to said base and extending upwardly therefrom. The base is configured as a housing 19 into which the banner retracts. The banner stand has a front side 19.1 and a backside 19.2. The x-y-z coordinate system is illustrated on several figures for illustration and explanation purposes.

In embodiments, banner stand can further comprise a horizontal support member having a curved form 20 selectively changeable from a first configuration into a curved configuration to selectively impart a curve to banner 12 when in an upright open position. Various embodiments of curved forms are described in further detail in U.S. Pat. No. 7,337,567 and U.S. patent application Ser. Nos. 11/926,949 and 12/042,213, which are incorporated by reference herein in their entirety. Banner 12 can be fabricated using a flexible-foldable material such poplin, but can also be made out a number of materials including, but not limited to, various textiles, polyplastic, and stretchable materials, such as LYCRA®.

Base 16 can comprise a plurality of feet 22 for stabilizing retractable banner stand 10. When retractable banner stand 10 is not in use and in a fully retracted position, feet 22 can be arranged to be substantially parallel or along a length of base 16. Once banner stand 10 is in use (FIG. 1), feet 22 can be arranged to be generally transverse to base 16. In this position, base 16 with feet 22 gives stability to banner stand 10. Various embodiments of feet are described in further detail in U.S. Pat. No. 7,337,567 and U.S. patent application Ser. Nos. 11/926,949 and 12/042,213, which are incorporated by reference herein in their entirety.

Figure 3A:
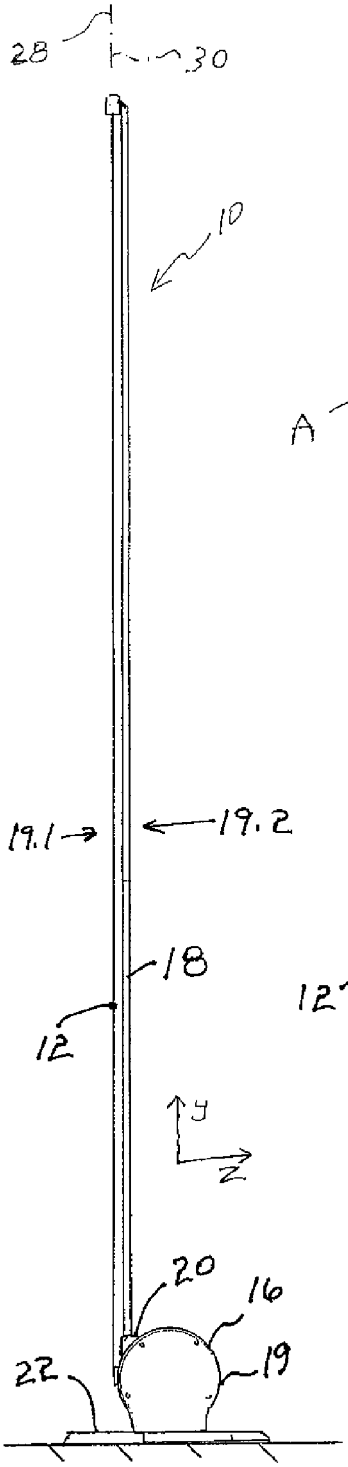
FIG. 3*a* is a side elevational view of the banner stand of FIG. 1 in an upright, non curved mode, with a post and banner of the banner stand being positioned vertically.
Figure 3B:
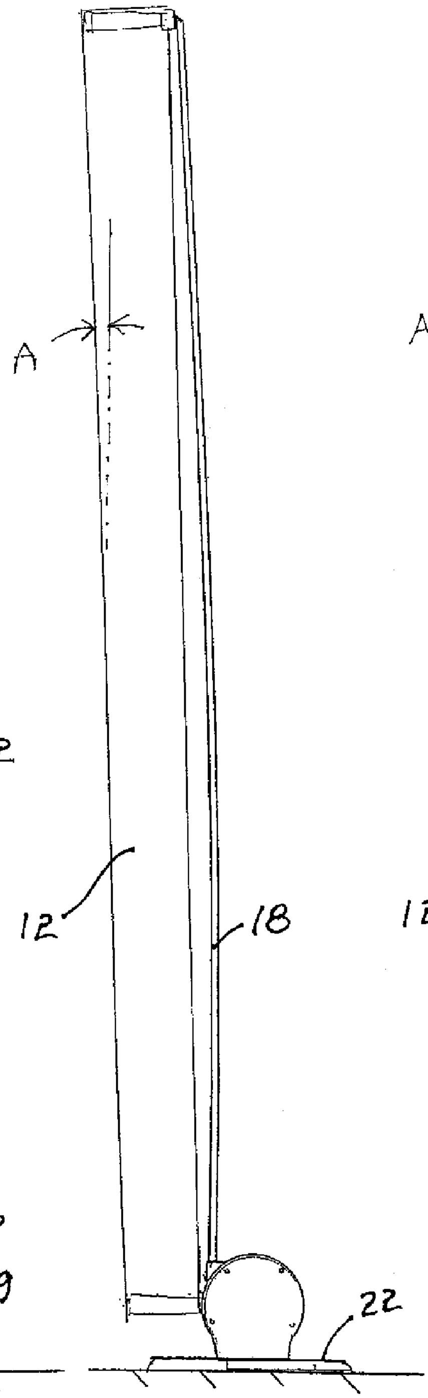
FIG. 3*b* is a side elevational view of the banner stand of FIG. 1 and FIG. 3*a* in an upright, curved mode, illustrating the bending moment provided to the post and without any angular adjustment of the post resulting in a forward tilt of the banner and post.
Figure 3C:
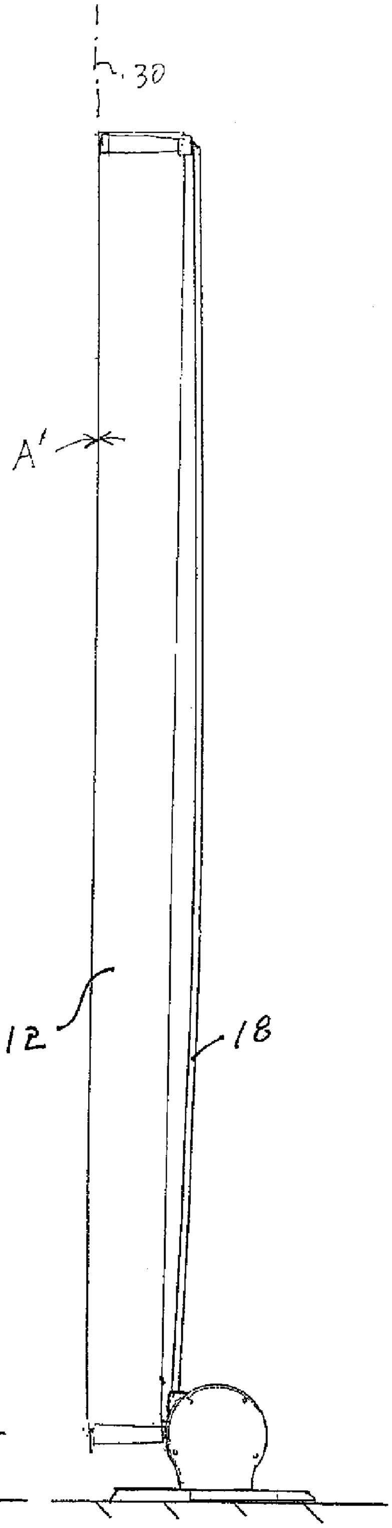
FIG. 3*c* is a side elevational view of the banner stand of FIGS. 1, 3*a*, and 3*b* in an upright, curved mode, with angular adjustment of the post rearwardly resulting in elimination of the forward tilt of the banner.
Figure 4:
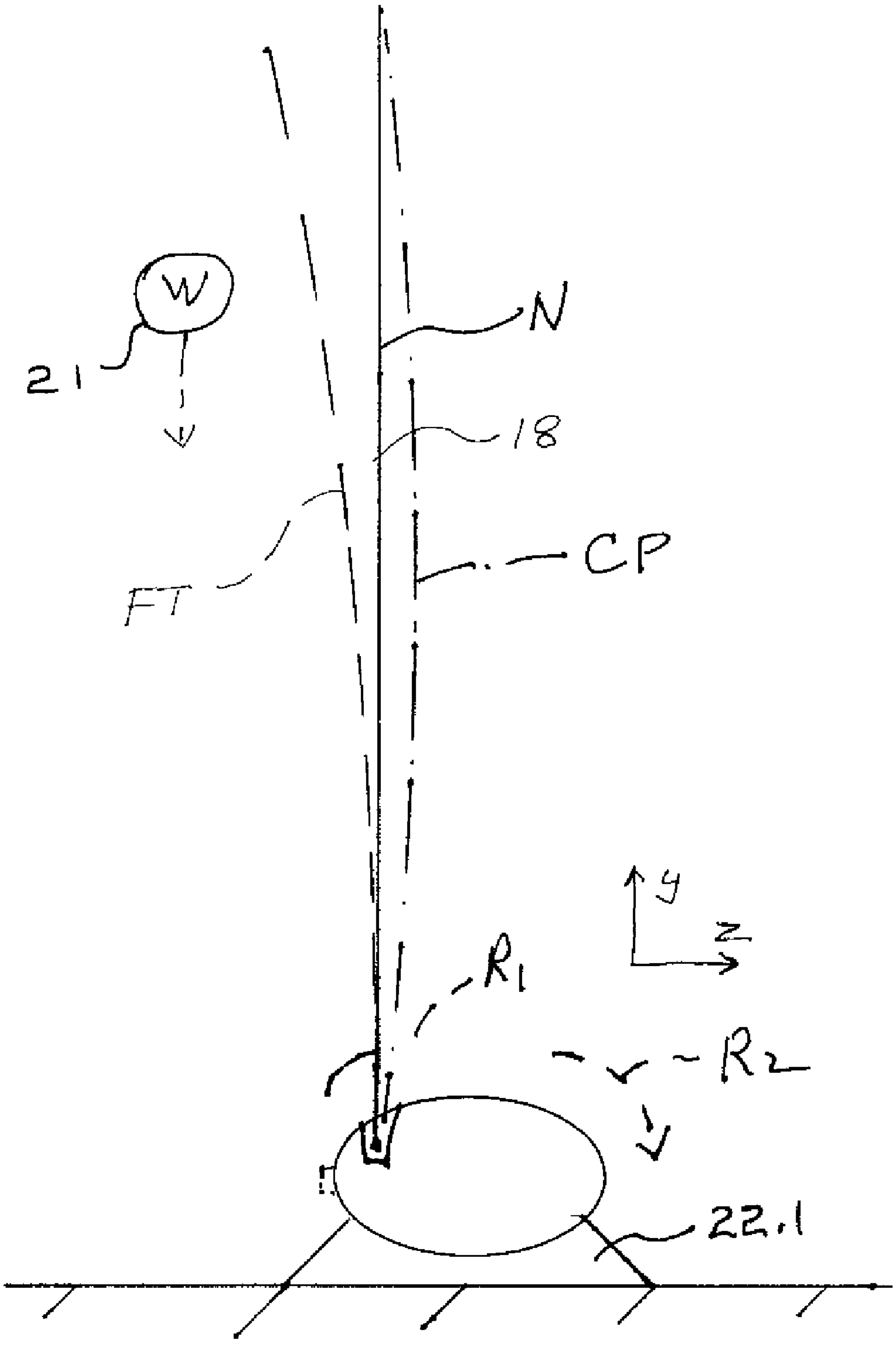
FIG. 4 is a schematic view representative of the different angulations of the lower portion of the post in an unloaded position, a loaded position, and a loaded angularly adjusted position to eliminate banner tilt.

As depicted in FIGS. 1*b*, 3*a*-3*c*, and 4, different positions of the post are effected by an adjuster or adjustment mechanism 24 configured to enable adjustment of a angular orientation of post 18 and banner 12, such as when a curve is imparted to banner 12 using curved form 20. Curved form 20 extends forward moving the center of gravity of the banner and horizontal support member forward which can cause post 18 of banner stand 10 to bend or "lean" or "tilt" forward, which in turn can then cause banner 12 to have a forward lean. As illustrated in FIG. 4, adding an appurtenance 21 with a weight W to the banner stand can create a sufficient loading to move to the post to the forward tilted position FT, particularly when placed at the top of the banner, such as the horizontal support member. Such an appurtenance may be lighting, a receptacle for printed materials, a video display screen, or other attachment usable in trade shows or retail displays.

Adjuster 24 is described in further detail in FIGS. 5-12. In embodiments the angular adjustment of the post effects a partial rotation of the post with respect to the housing, the post being pivotally placed or fixed thereto. Such adjustment moves the post to a corrected position CP as shown on FIG. 4 that returns the top of the loaded post in alignment with the post in the normal or unloaded position N.

Figure 1A:
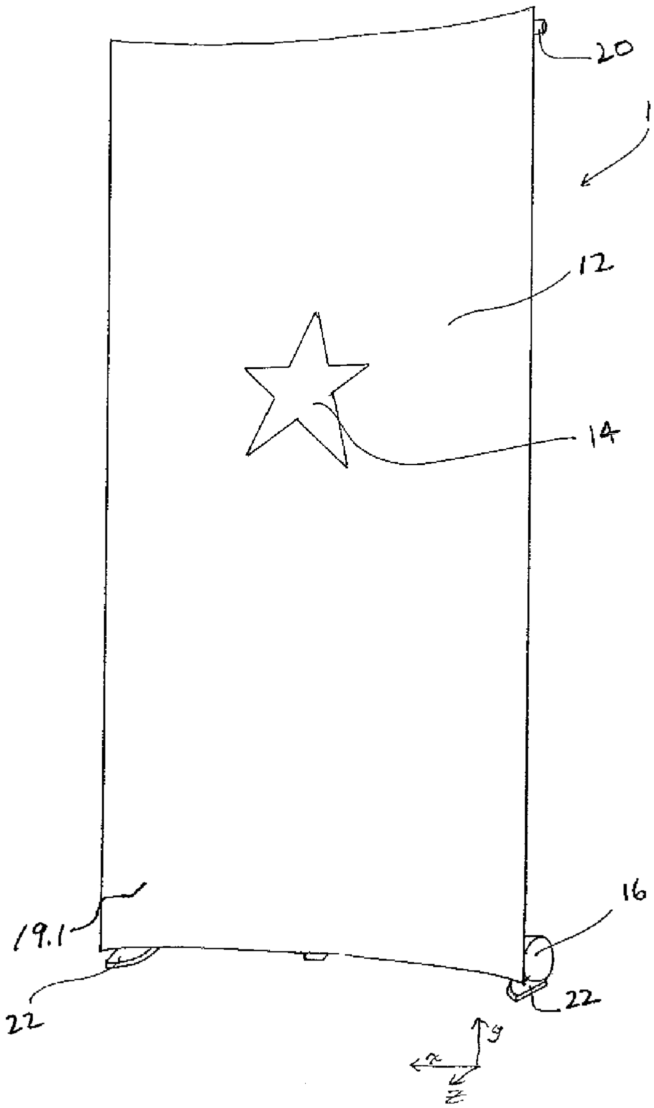
FIG. 1*a* is a front perspective view of a banner stand according to a first embodiment in an upright, curved mode.
Figure 2A:
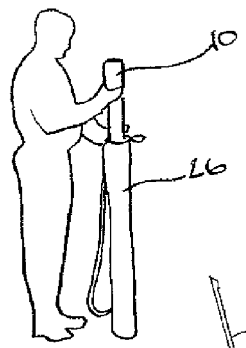
FIGS. 2*a*-2*e* depict steps of the banner stand of FIG. 1 being unpacked, assembled, and erected.
Figure 2B:
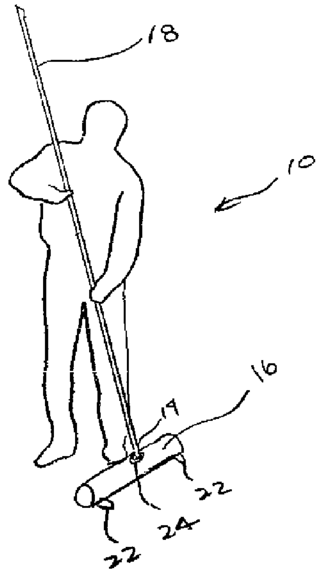
Figure 2C:
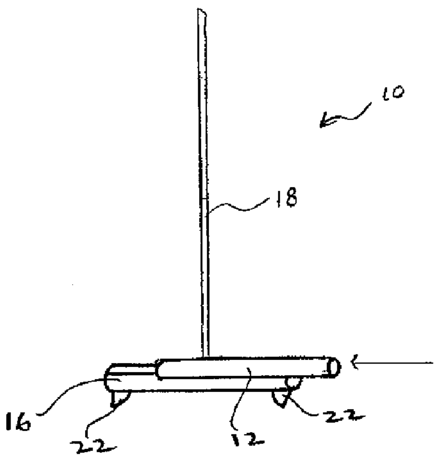
Figure 2D:
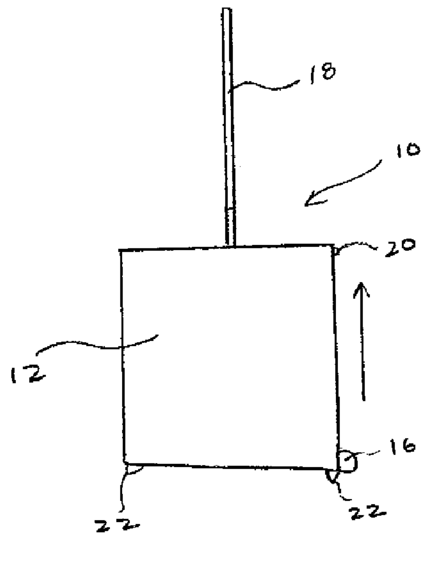

Referring to FIGS. 2*a*-2*e*, details of assembly of a retractable banner stand are depicted and described. In FIG. 2*a*, banner stand 10 can first be removed from a travel case 26 that can be used when transporting banner stand 10 to and from its place of use or storage. Referring to FIG. 2*b*, after banner stand 10 has been removed from case 26, post 18 of banner stand 10 can be operably coupled with base 16. In an embodiment, a bottom portion 19 of post 18 can be inserted into adjuster 24 presented on a top of base 16. If banner 12 is not yet operably connected to base 16, or if a user desires to replace a first banner with a new banner, banner 12 can be operably coupled to base 16, as depicted in FIG. 2*c*. Referring to FIG. 2*d*, banner 12 can then be unrolled (if rolled) or retracted and operably coupled with a top portion of post 18, such that banner 12 is in an upright, open mode. Curved form 20 can then be changed from a first configuration into a curved configuration, as indicated by directional arrows in FIG. 2*e*, to selectively impart a curve to banner 12, such as depicted in FIG. 1. Details of mechanisms suitable for imparting such a curvature are illustrated in U.S. patent application Ser. No. 12/042,213 which is incorporated herein by reference.

Referring to FIGS. 3*a*, 3*b*, and 3*c*, as described above, when imparting such curvature to banner 12, curved form 20 can cause post 18 to bend or "lean" forward, which in turn can cause a banner axis 28 of banner 12 to be at a first angle A relative to an absolute vertical 30. This can be undesirable when an exhibitor wants a banner or display to be substantially vertically oriented without any lean. As will be discussed in further detail below with respect to FIG. 13, adjuster 24 presented with post 18 can be used to adjust banner axis 28 relative to absolute vertical 30 from first angle A to a second angle A'. Second angle A' can be substantially zero degrees, such that banner 12 is substantially at absolute vertical.

Figure 5:
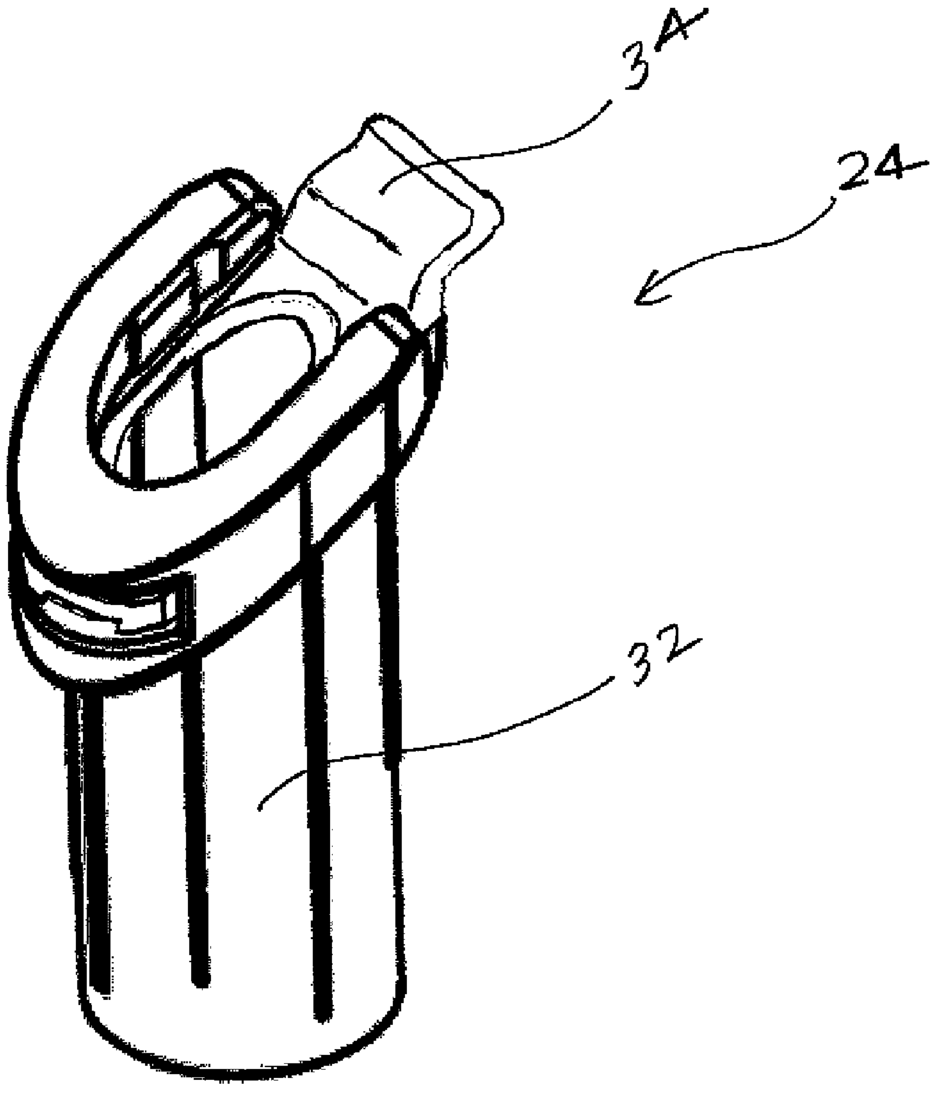
FIG. 5 is a front perspective view of the post adjuster of FIG. 4 according to a first embodiment.
Figure 6:
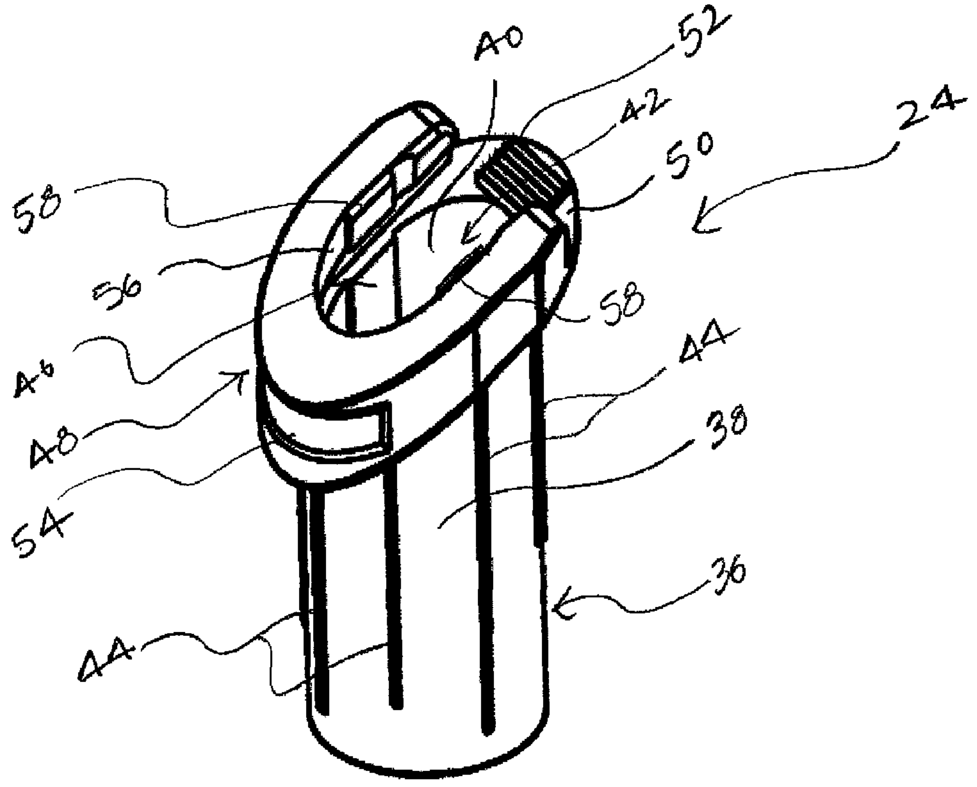
FIG. 6 is a front perspective view of a cup portion of the post adjuster of FIG. 5.
Figure 7:
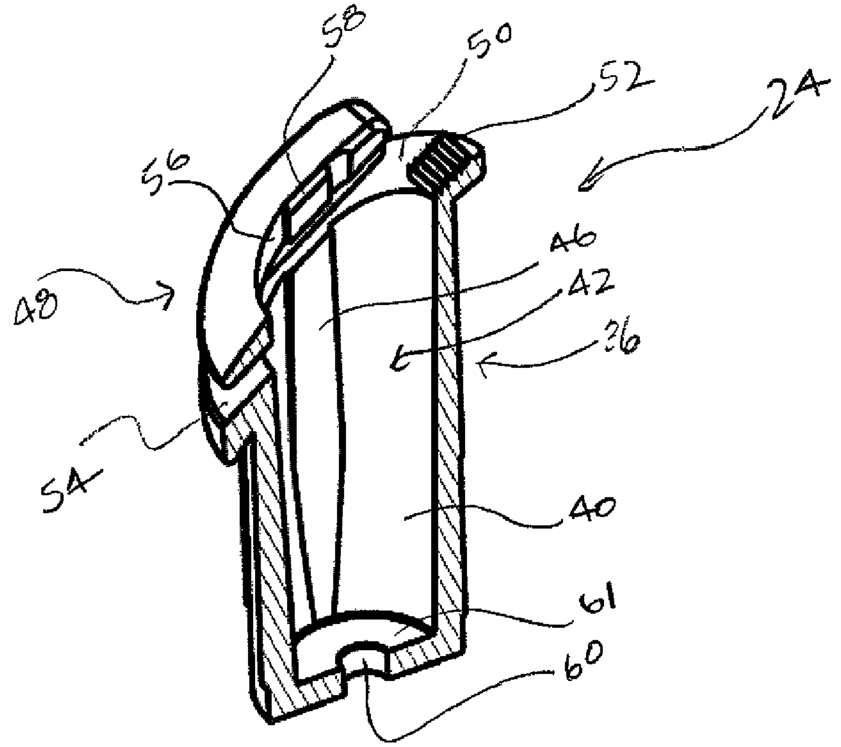
FIG. 7 is a cross-sectional view of the cup portion of FIG. 6 depicting a cavity thereof.

Referring to FIG. 5, adjuster 24 generally can comprise a cup portion 32 and a slider potion 34. Referring to FIGS. 6 and 7, cup portion 32 comprises a wall portion 36 having an outer surface 38 and an inner surface 40 presenting a cavity 42 therein. While depicted as being cylindrical, wall portion 36 can comprise alternative shapes. Outer surface 38 can include one or more outer ribs 44 thereon enabling a friction fit with an opening on base (not depicted) when adjuster 24 is inserted therein for assembly. Likewise, inner surface 40 presenting cavity 42 can include one or more inner ribs 46 therein enabling a friction fit with an end of post 18 when post 18 is inserted therein.

A flange portion 48 is presented on wall portion 36. Flange portion 48 can be at an angle corresponding to a portion of base in which adjuster 24 is inserted, so as to be streamlined for aesthetic or non-aesthetic reasons when inserted in or coupled with base 16. Flange portion 48 can comprise a first opening 50 presented at a first end including one or more teeth 52 or ratcheting elements. Flange portion 48 can further comprise a second opening 54 presented at a second end opposed first end. An inner surface 56 of flange portion 48, generally corresponding to inner surface 40 of wall portion 36 presenting cavity 42, can include one or more inner ribs 58 therein to cooperate with inner ribs 46 presented on inner surface 56 to enable a friction fit with an end of post 18 when post 18 is inserted therein. Referring to FIG. 7, an aperture 60 can be included at a bottom 61 of cup portion 36 to enable any debris falling into cavity 42 to be removed from cup portion 36.

In an embodiment, cup portion 32 can be constructed of injection-molded Nylon 6. However, those skilled in the art will recognize that other processes and materials can be used without departing from the scope of the invention.

Figure 8:
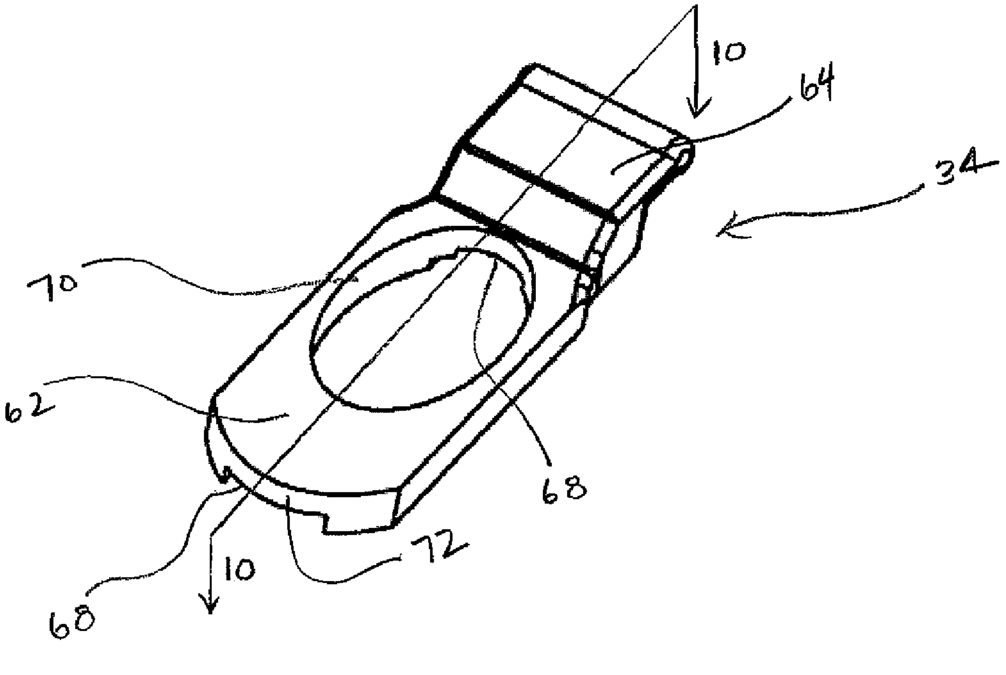
FIG. 8 is a top front perspective view of a slider portion of the post adjuster of FIG. 5.
Figure 9:
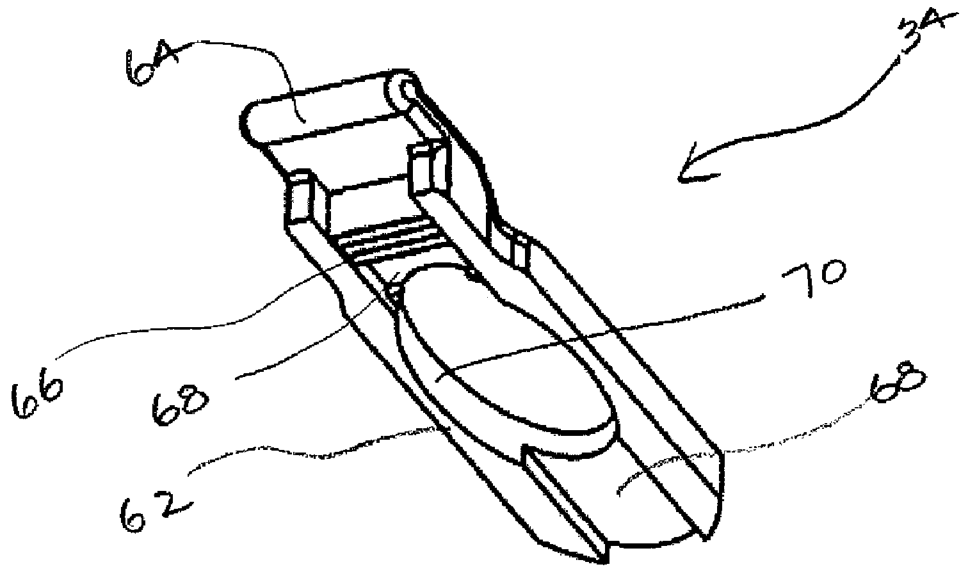
FIG. 9 is a bottom rear perspective view of the slider portion of FIG. 8.
Figure 10:
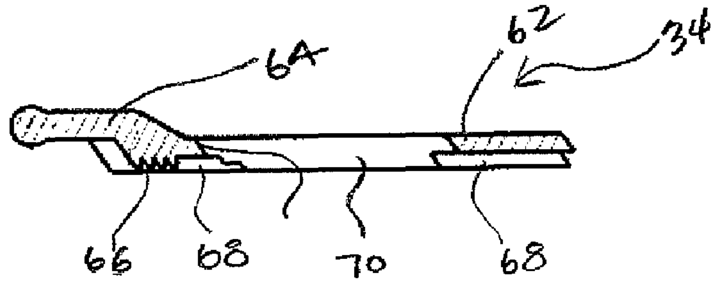
FIG. 10 is a cross-sectional view of the slider portion of FIG. 8 taken along line 10-10.

Referring to FIGS. 8-10, slider portion 34 comprises a body 62 and a flange 64 extending therefrom. Body 62 can comprise one or more teeth 66 or ratcheting elements on an underside thereof that can operably cooperate with ratcheting elements 52 on flange portion 48 of cup portion 24. Body 62 can further include a channel 68 extending along a length of an underside of slider portion 34 enabling slider to be passed by or over ratcheting elements 52 on flange portion 48 when slider portion 34 is inserted into and through first and second openings 50, 54 on flange portion 48 without being impeded by ratcheting elements 52 on flange portion 48. Slider 34 further includes a circular aperture 70 through a thickness thereof that generally corresponds to inner surfaces 40, 56 of wall and flange portions, 36, 48, respectively.

In an embodiment, slider portion 34 can be constructed of injection-molded Nylon 6. However, those skilled in the art will recognize that other processes and materials can be used without departing from the scope of the invention.

To assemble adjuster 24, a first end 72 of slider portion 34 is inserted into first opening 50 on flange portion 48 of cup portion 24. Movement of slider is effected such that first end 72 moves into second opening 54 until circular aperture 70 is generally aligned with inner surfaces 40, 56 of wall and flange portions, 36, 48. As discussed above, channel 68 extending along an underside of slider portion 34 enables slider to be passed by or over ratcheting elements 52 on flange portion 48 when slider portion 34 is inserted into and through first and second openings 50, 54 on flange portion 48 without being impeded by ratcheting elements 52 on flange portion 48 while slider portion 34 is being inserted and moved into position, ratcheting elements 66 on slider 34 can engage/ratchet with ratcheting elements 52 on flange portion 48 to selectively secure slider 34 with respect to cup portion 32 and enable selective positioning of slider 34 with respect to cup portion 32.

Figure 2E:
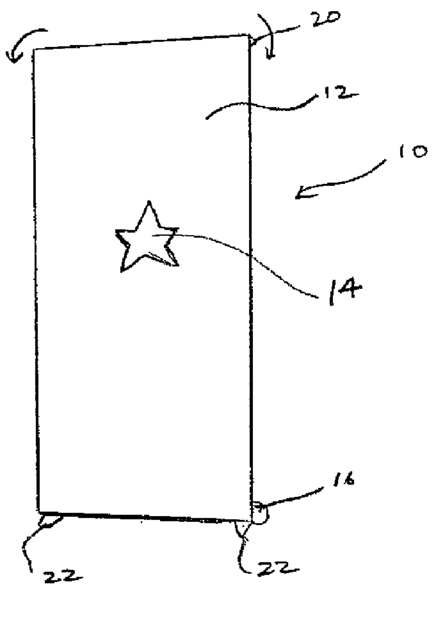
Figure 11:
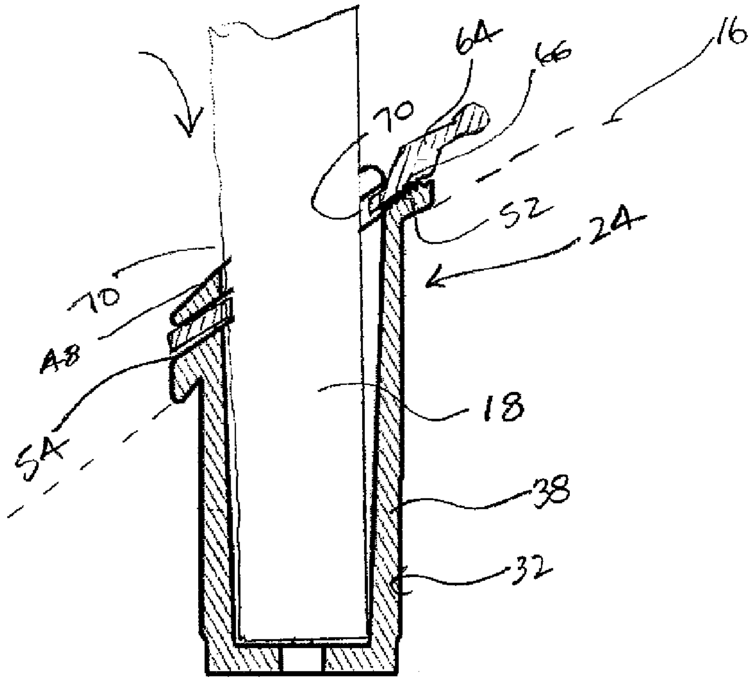
FIG. 11 is a cross-sectional view of the adjuster of FIG. 5 depicting a bottom portion of a post of the banner stand of FIG. 1 when initially inserted in the adjuster and after a curve has been imparted to the banner, such as depicted in FIG. 3.

Referring to FIG. 11, once aperture 70 is generally aligned with inner surfaces 40, 56 of wall and flange portions, 36, 48, end 19 of post 18 can be inserted through aperture 70 and into cavity. As discussed above, referring to FIG. 2*d*, banner 12 can then be unrolled (if rolled) and operably coupled with a top portion of post 18, such that banner 12 is in an upright, open mode. Referring to FIGS. 2*e* and 3, curved form 20 can then be changed from a first configuration into a curved configuration to selectively impart a curve to banner 12, as depicted in FIG. 1. When this is done, curved form can cause post 18 can cause banner 12 to bend or "lean" forward.

Figure 12:
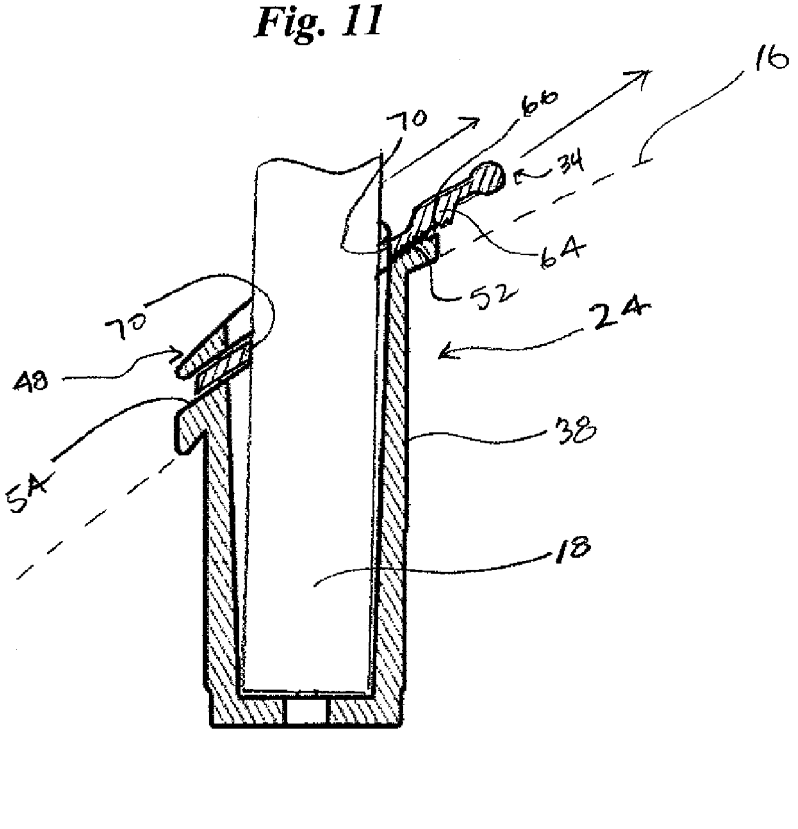
FIG. 12 is a cross-sectional view of the adjuster of FIG. 5 depicting a bottom portion of a post of the banner stand of FIG. 1 after an angle of the post is adjusted using the adjuster.

Referring to FIGS. 3*c*, 4, and 12 to counter this effect, adjuster 24 can be used to return banner axis 28 into substantial alignment with absolute vertical 30, such that an angle A' between banner axis 28 and absolute vertical 30 is substantially zero (absolute vertical 30 and banner axis 28 substantially aligned co-linearly). To do so, slider portion 34 can be moved in and out of flange portion 48, as desired, using a ratcheting motion, until banner axis 28 is as desired. Each step or ratchet can correspond to a predetermined distance such that incremental adjustments to the position of slider portion 34 relative to cup portion 32 can be made. At the adjusted position CP the post my be angled forward and have a curved shape, concave forwardly, due to the continued loading. However the top of the post is back into the vertical alignment of the normal N position of the post. In addition to pivoting the post with respect to the housing indicated by arrow R1, the housing could be rotated with respect to a foot assembly 22.1 as indicated by arrow R2.

The invention also includes the methodology of compensating for the forward tilt of a curved banner stand by selectively pivoting the post rearwardly on the housing. The invention also includes the methodology of manufacturing a curved banner stand including the steps of installing a pivoting mechanism for the end of the support ports that is received in the housing top. The invention also includes the methodology of compensating for the forward tilt of a curved banner stand by tilting the post and banner rearwardly with respect to the horizontal floor. The invention also includes the methodology of manufacturing a curved banner stand including the steps of installing a pivoting mechanism for the banner post with respect to the horizontal. Such mechanism may be associated with the receptacle that receives the post or the housing floor interface, such as feet pivotally adjustable about a horizontal axis. Feet pivotal on a vertical axis are illustrated in the figures.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. For purposes of the present disclosure, incorporation by reference of any reference, patent or published application is deemed to be limited such that no subject matter is incorporated that is contrary to the explicit disclosure herein and any definitions provided in the documents are not incorporated by reference herein unless expressly included herein.

What is claimed is:

1. A banner stand having a front side and a back side, the banner stand comprising;

a banner presenting graphics thereon; a base configured to sit on a horizontal floor surface and comprising a housing and feet extending from the housing, the housing for retracting the banner therein, a post operably coupleable to said base and extending upwardly therefrom; a support member operably coupleable with the top of said post to support said banner in an upright display mode when the banner is extended from the housing; the banner convertible between a generally upright planar configuration and an upright curved configuration with the banner curved about an upright curvature axis, whereby when the banner is in the upright curved configuration the post is loaded urging a forward tilt of the banner as compared to when the banner is in the generally upright planar configuration; and an adjuster presented with said base and configured to enable angular adjustment of said post with respect to the base to counter the forward tilt of the banner caused by the banner being converted to the curved configuration from the generally upright planar configuration, the adjuster providing a first position for the post for when the banner is in the generally upright planar configuration and a second position for the post when the banner is the curved configuration.

2. The banner stand of claim 1, where a plurality of selectable mechanisms are provided at the horizontal support member and the base to impart the curvature to the banner.

3. The banner stand of claim 1, wherein said adjuster comprises a cup portion with a cavity therein, an end of said post being inserted into said cavity to operably couple said post to said base.

4. The banner stand of claim 1, wherein said adjuster is configured as a pivoting mechanism and further comprises a cup portion and a slider portion, wherein said slider portion is slidably movable relative to said cup portion to enable adjustment of said banner upright curvature axis relative to absolute vertical.

5. The banner stand of claim 4, wherein said cup portion comprises a first set of teeth and said slider portion comprises a second set of teeth, said first and second sets of teeth engageable to enable incremental adjustment of said banner upright curvature axis relative to said absolute vertical.

6. The banner stand of claim 4, wherein said cup portion comprises a cavity therein and said slider portion comprises an aperture therethrough, said post being insertable into said cavity through said aperture, said slider portion with said aperture movable relative to said cavity to effect angular movement of said post enabling adjustment of said banner upright curvature axis relative to said absolute vertical.

7. The banner stand of claim 1, wherein said adjustment mechanism comprises a post cup operably coupleable with said base and a slide, said post cup comprising: a cavity therein and said slide comprises an aperture therethrough, said post being insertable into said cavity through said aperture; and a first set of teeth and said slide comprising a second set of teeth, said first and second sets of teeth ratchetably engageable to enable incremental adjustment of said banner axis relative to said absolute vertical.

8. A method providing a tradeshow display and instructions for selectively adjusting a vertical axis of thereof, said method comprising: providing a tradeshow display comprising: a banner presenting graphics thereon; a base and a post operably coupleable to said base to extend upwardly therefrom, the banner retractable into and extendable from the base; a support member operably coupleable with the top of said post to support said banner in an upright display mode, where by when said banner is an upright display mode, said banner comprises a banner axis along a length thereof; a plurality of selectable mechanisms are provided at the horizontal support member and the base to impart a curvature to the banner about an upright axis, whereby when the banner has a curvature, the post is loaded forwardly urging a forward tilt of the banner; an adjuster presented with said base to adjust said banner axis relative to said absolute vertical to compensate for when said post is loaded forwardly; and utilizing said adjuster to adjust said banner axis relative to said absolute vertical, such that said angle is substantially equal to zero degrees.

9. The method of claim 8, wherein said adjuster comprises a first portion and a slider portion, said method further comprising moving said slider portion relative to said first portion to adjust said banner axis relative to said absolute vertical.

10. The method of claim 9, wherein said first portion comprises a first set of teeth and said slider portion comprises a second set of teeth, said method further comprising incrementally adjusting said banner axis relative to said absolute vertical by ratchetably engaging said teeth.

11. The method of claim 8, wherein said adjuster comprises a post cup comprising a cavity therein and a slide comprising an aperture through a thickness thereof, said method further comprising instructions to:

insert an end of said post into said cavity through said aperture; and effect movement of said aperture relative to said cavity to effect angular movement of said post to adjust said banner axis relative to said absolute vertical.

12. A method of adjusting a vertical axis of a tradeshow display, said method comprising: providing a tradeshow display comprising: a base; a banner presenting graphics thereon, the banner extendable from and retractable into the base; a post operably coupleable to said base to extend upwardly therefrom; a support member operably coupleable with said post to support said banner in an upright display mode, wherein when said banner is an upright display mode, said banner comprises a banner axis along a length thereof; a plurality of selectable mechanisms for imparting a curvature to the banner about an upright axis; and an adjuster presented with said base to adjust said banner axis relative to said absolute vertical; and the method further comprising the steps of: extending the banner from the base, determining if said banner axis is at an angle greater than zero relative to an absolute vertical, wherein if said angle is greater than zero degrees, utilize said adjuster to adjust said banner axis relative to said absolute vertical, such that said angle is substantially equal to zero degrees.

13. A tradeshow display comprising one or more banner stands, each of said banner stands comprising:

a banner formed of a flexible sheet material for suspending in a substantially upright open position, said banner having graphics thereon;

a housing comprising a core for winding said banner thereon and a retracting mechanism for unwinding and winding said banner with respect to said core;

a post extending upwardly from said housing;

a support member operably coupleable with said post to support said banner in an upright display mode when said banner is unwound from said housing, wherein when said banner is the upright display mode, said banner comprises a banner axis along a length thereof; and a curved form selectively changeable from a first configuration into a curved configuration to selectively impart a curve to said banner when said banner is in the upright open position, wherein when said curve is imparted to said banner, said curved form causes said angle to be greater than zero degrees; and a post adjuster having a first portion having a cavity therein and a slider portion comprising an aperture therethrough, said post being insertable into said cavity through said aperture, said aperture movable relative to said cavity to effect angular movement of said post enabling adjustment of said banner axis relative to said absolute vertical.

* * * * *